(12) United States Patent
Foxworthy et al.

(10) Patent No.: US 8,279,748 B2
(45) Date of Patent: Oct. 2, 2012

(54) CORE-BASED SATELLITE NETWORK ARCHITECTURE

(75) Inventors: Michael Foxworthy, Carlsbad, CA (US); Girish Chandran, Carlsbad, CA (US); Jason Lau, Lafayette, LA (US)

(73) Assignee: ViaSat, Inc., Carlsbad, CA (US)

( * ) Notice: Subject to any disclaimer, the term of this patent is extended or adjusted under 35 U.S.C. 154(b) by 268 days.

(21) Appl. No.: 12/761,968

(22) Filed: Apr. 16, 2010

(65) Prior Publication Data

US 2010/0265957 A1    Oct. 21, 2010

Related U.S. Application Data

(60) Provisional application No. 61/170,359, filed on Apr. 17, 2009, provisional application No. 61/313,017, filed on Mar. 11, 2010, provisional application No. 61/254,551, filed on Oct. 23, 2009, provisional application No. 61/254,553, filed on Oct. 23, 2009, provisional application No. 61/254,554, filed on Oct. 23, 2009.

(51) Int. Cl.
*G01R 31/08* (2006.01)

(52) U.S. Cl. .......................................... 370/216; 370/229

(58) Field of Classification Search ...................... None
See application file for complete search history.

(56) References Cited

U.S. PATENT DOCUMENTS

| | | |
|---|---|---|
| 5,717,686 A | 2/1998 | Schiavoni |
| 5,875,461 A | 2/1999 | Lindholm |
| 5,899,980 A | 5/1999 | Wilf et al. |
| 5,940,394 A | 8/1999 | Killian |
| 6,052,560 A | 4/2000 | Karabinis |
| 6,112,083 A | 8/2000 | Sweet et al. |
| 6,240,072 B1 | 5/2001 | Lo et al. |
| 6,249,677 B1 | 6/2001 | Noerpel et al. |
| 6,934,262 B1 | 8/2005 | Lau et al. |
| 7,017,042 B1 | 3/2006 | Ziai et al. |
| 7,032,242 B1 | 4/2006 | Grabelsky et al. |
| 7,174,373 B1 | 2/2007 | Lausier |

(Continued)

FOREIGN PATENT DOCUMENTS

GB    2374494 A    10/2002

(Continued)

OTHER PUBLICATIONS

U.S. Appl. No. 12/761,834, filed Apr. 16, 2010, 40 pages.

(Continued)

*Primary Examiner* — Robert Wilson
(74) *Attorney, Agent, or Firm* — Holland & Hart LLP

(57) ABSTRACT

Systems and methods for implementing a satellite network, are described. The system includes satellite gateways in communication with subscribers over a satellite communication network. The satellite gateways send network communications to the subscribers and receive network communications from the subscribers. The system further includes a first core node in communication with at least one of the satellite gateways. The first core node provides networking services, at L2, to a first subset of subscribers. The system further includes a second core node in communication, at L2, with one of the satellite gateways and the first core node. The second core node provides the networking services, at layer-2 of the OSI model, to a second subset of the subscribers. In response to failure of at least one of the networking services in the first core node, the second core node providing the at least one of the services to the first subset of the subscribers.

19 Claims, 9 Drawing Sheets

U.S. PATENT DOCUMENTS

| | | | |
|---|---|---|---|
| 7,289,440 B1 | 10/2007 | Beshal et al. | |
| 7,386,723 B2 | 6/2008 | Seada et al. | |
| 7,889,728 B2 | 2/2011 | Arad et al. | |
| 7,983,255 B2 | 7/2011 | Kue | |
| 7,992,174 B2 | 8/2011 | Gin et al. | |
| 8,019,841 B2 | 9/2011 | Ellis et al. | |
| 8,081,633 B2 | 12/2011 | Veits | |
| 2001/0026537 A1 | 10/2001 | Massey | |
| 2001/0033580 A1 | 10/2001 | Dorsey et al. | |
| 2001/0036161 A1 | 11/2001 | Eidenschink et al. | |
| 2003/0069926 A1 | 4/2003 | Weaver et al. | |
| 2004/0208121 A1 | 10/2004 | Gin et al. | |
| 2006/0047851 A1 | 3/2006 | Voit et al. | |
| 2006/0050736 A1 | 3/2006 | Segel | |
| 2006/0171369 A1 | 8/2006 | Ostrup et al. | |
| 2006/0262724 A1 | 11/2006 | Friedman et al. | |
| 2006/0274744 A1 | 12/2006 | Nagai et al. | |
| 2007/0076607 A1 | 4/2007 | Voit et al. | |
| 2007/0104096 A1* | 5/2007 | Ribera | 370/229 |
| 2007/0147279 A1 | 6/2007 | Smith et al. | |
| 2007/0171918 A1 | 7/2007 | Ota et al. | |
| 2009/0067429 A1 | 3/2009 | Nagai et al. | |
| 2009/0092137 A1 | 4/2009 | Haigh et al. | |
| 2010/0260043 A1* | 10/2010 | Kimmich et al. | 370/229 |
| 2010/0265876 A1 | 10/2010 | Foxworthy et al. | |
| 2010/0265877 A1 | 10/2010 | Foxworthy et al. | |
| 2010/0265878 A1 | 10/2010 | Foxworthy et al. | |
| 2010/0265879 A1 | 10/2010 | Foxworthy et al. | |
| 2010/0265941 A1 | 10/2010 | Foxworthy et al. | |
| 2010/0265950 A1 | 10/2010 | Foxworthy et al. | |

FOREIGN PATENT DOCUMENTS

| | | |
|---|---|---|
| WO | WO 03/021866 A2 | 3/2003 |
| WO | WO 2005/082040 A2 | 9/2005 |
| WO | WO 2007/103369 A2 | 9/2007 |
| WO | WO 2007/133786 A2 | 11/2007 |

OTHER PUBLICATIONS

U.S. Appl. No. 12/761,858, filed Apr. 16, 2010, 40 pages.
U.S. Appl. No. 12/761,882, filed Apr. 16, 2010, 41 pages.
U.S. Appl. No. 12/761,904, filed Apr. 16, 2010, 40 pages.
U.S. Appl. No. 12/761,941, filed Apr. 16, 2010, 36 pages.
U.S. Appl. No. 12/761,996, filed Apr. 16, 2010, 42 pages.
Akyildiz, I. F. et al., "A survey of mobility management in next-generation all-IP-based wireless systems", IEEE Wireless Communications, IEEE Service Center, Piscataway, NJ, US, vol. 11, No. 4, Aug. 1, 2004, pp. 16-28.
Akyildiz, I. F. et al., "Mobility Management in Current and Future Communications Networks", IEEE Network, IEEE Service Center, New York, NY USA, vol. 12, No. 4, Jul. 1, 1998, pp. 39-49.
Akyildiz, Ian F. et al., "Mobility Management in Next-Generation Wireless Systems", Proceedings of the IEEE, New York, US, vol. 87, No. 8, Aug. 1, 1999.
Held, G. ED—Gilbert Held: "Virtual Private Networking, Introduction to Virtual Provate Networking", Dec. 31, 2004, Virtual Private Networking: A Construction Operation and Utilization Guide, Joh Wiley & Sons, GB, pp. 1-22.
Industrial Consortium for S-UMTS: "Final Report S-UMTS: Preparation of Next Generation Universal Mobile Satellite Telecommunications Systems", Nov. 29, 2000, pp. 1-35.
Kota, S. L. et al., "Integrated SATCOM/Terrestrial Networking: Protocols and DISN/Teleport Interface", Proceedings of the Military Communications Conference (MILCOM), San Diego, Nov. 6-8, 1995, New Your, IEEE, US, vol. 1, Nov. 6, 1995, pp. 453-459, XP 000580864.
Mancuso, V. et al., "Switched Ethernet Networking over LEO Satellite", Wireless Communication Systems, 2005, 2nd International Symposium on Siena, Italy, Sep. 5-9, 2005, Piscataway, NJ, USA, IEEE, pp. 883-887, Sections I. "Introduction" to IV. Impact on Network Services, pp. 883-886.
PCT International Search Report and Written Opinion mailed Aug. 2, 2010, International Application No. PCT/US2010/031510, 17 pages.
PCT International Search Report and Written Opinion mailed Jul. 23, 2010, International Application No. PCT/US2010/031509, 15 pages.
PCT International Search Report and Written Opinion mailed Jul. 27, 2010, International Application No. PCT/US2010/031514, 14 pages.
PCT International Search Report and Written Opinion mailed Jul. 29, 2010, International Application No. PCT/US2010/031508, 17 pages.
PCT International Search Report and Written Opinion mailed Nov. 23, 2010, International Application No. PCT/US2010/031513, 20 pages.
PCT International Search Report and Written Opinion mailed Sep. 20, 2010, International Application No. PCT/US2010/031515, 25 pages.
PCT International Search Report and Written Opinion mailed Sep. 3, 2010, International Application No. PCT/US2010/031511, 16 pages.
PCT Invitation to Pay Additional Fees mailed Jul. 29, 2010, International Application No. PCT/US2010/031515, 9 pages.
Shen Quingguo, "Handover in Packet-Domain UMTS", EE Times Design, Aug. 2, 2002, retrieved from the internet on Aug. 2, 2010 at: http://www.eetimes.com/design/communications-design/4018087/Handover-in-packet-Domain-UMTS, pp. 1-6.
Shneyderman, Alex: "Mobile VPNs for Next Generation GPRS and UMTS Networks", White Paper Lucent Technologies, Dec. 31, 2000, retrieved online on Aug. 5, 2010 at http://esoumoy.free.fr/telecom/tutorial/3G-VPN.pdf, 16 pgs.
Tissa Senevirathne Som Sikidar Neena Premmaraju (FORCE10): "Ethernet Over IP—A Layer 2 VPN Solution using Generic Routing Encapsulation (GRE); draft-tsenevir-12vpn-gre-00.txt", IETF Standard-Working-Draft, Internet Engineering Task Force, IETF, CH, Jul. 1, 2001, XP015036263.
Feltrin, E. et al., "Design, Implementation and Performances Analysis of an On Board Processor-Based Satellite Network", Communications, 2004 IEEE International Conference on, vol. 6 Jun. 20-24, 2004, pp. 3321-3325.
Non-Final Office Action for U.S. Appl. No. 12/761,834, mailed on May 18, 2012; 17 pages.
Non-Final Office Action for U.S. Appl. No. 12/761,882, mailed on Mar. 6, 2012; 23 pages.
Non-Final Office Action for U.S. Appl. No. 12/761,996, mailed on Mar. 20, 2012; 17 pages.
International Preliminary Report on Patentability mailed Jul. 1, 2011 for International Application No. PCT/US2010/031510, 13 pages.
International Preliminary Report on Patentability mailed Jul. 1, 2011 for International Application No. PCT/US2010/031509, 10 pages.
International Preliminary Report on Patentability mailed May 23, 2011 for International Application No. PCT/US2010/031514, 10 pages.
International Preliminary Report on Patentability mailed Jul. 1, 2011 for International Application No. PCT/US2010/031508, 12 pages.
International Preliminary Report on Patentability mailed Aug. 2, 2011 for International Application No. PCT/US2010/031513, 16 pages.
International Search Report and Written Opinion mailed Jul. 1, 2011 for International Application No. PCT/US2010/031513, 21 pages.
International Preliminary Report on Patentability mailed Aug. 2, 2011 for International Application No. PCT/US2010/031515, 13 pages.
International Preliminary Report on Patentability mailed Aug. 2, 2011 for International Application No. PCT/US2010/031511, 13 pages.
Final Office Action dated Jul. 24, 2012, Layer-2 Extension Services, U.S. Appl. No. 12/761,882, 10 pgs.
Notice of Allowance dated Jul. 27, 2012, Acceleration Through a Network Tunnel, U.S. Appl. No. 12/761,996, 15 pgs.
Notice of Allowance and Examiner Initiated Interview Summary dated Jun. 21, 2012, Access Node/Gateway to Access Node/Gateway Layer-2 Connectivity (End-to-End), U.S. Appl. No. 12/761,858, 18 pgs.
Non-final Office Action dated Jun. 15, 2012, Mobility Across Satellite Beams Using L2 Connectivity, U.S. Appl. No. 12/761,904, 12 pgs.

* cited by examiner

CORE-BASED SATELLITE NETWORK ARCHITECTURE

PRIORITY CLAIM

This application claims priority to U.S. Provisional Application No. 61/170,359, entitled DISTRIBUTED BASE STATION SATELLITE TOPOLOGY, filed on Apr. 17, 2009, and also claims priority to U.S. Provisional Application No. 61/313,017, entitled CORE-BASED SATELLITE NETWORK ARCHITECTURE, filed on Mar. 11, 2010, which are both incorporated by reference in their entirety for any and all purposes.

RELATED APPLICATIONS

This application is related to U.S. Provisional Application No. 61/254,551, entitled "Layer-2 Connectivity From Switch to Access Node/Gateway", filed on Oct. 23, 2009, U.S. Provisional Application No. 61/254,553, entitled "Access Node/Gateway to Access Node/Gateway Layer-2 Connectivity (End-to-End)", filed on Oct. 23, 2009, and U.S. Provisional Application No. 61/254,554, entitled "Layer-2 Extension Services", filed on Oct. 23, 2009, which are all incorporated by reference herewith in their entirety for any and all purposes. The application is also related to U.S. patent application Ser. No. 12/761,834 entitled "Layer-2 Connectivity from Switch to Access Node/Gateway" (pending), U.S. patent application Ser. No. 12/761,858 entitled "Access Node/Gateway to Access Node/Gateway Layer-2 Connectivity (End-to End)" (pending), U.S. patent application Ser. No. 12/761,904 entitled "Mobility Across Satellite Beams Using L2 Connectivity" (pending), U.S. patent application Ser. No. 12/761,941 entitled "Multi-Satellite Architecture" (pending), U.S. patent application Ser. No. 12/761,882 entitled "Layer-2 Extension Services" (pending) and U.S. patent application Ser. No. 12/761,996 entitled "Acceleration Through a Network Tunnel" (pending).

FIELD OF THE INVENTION

The present invention relates, in general, to satellite networks, and more particularly, to a core with nodes and gateways interconnected with layer-2.

BACKGROUND OF THE INVENTION

Presently, gateways in satellite networks are configured to support a number of services and perform a variety of network functions. For example, gateways perform IP Routing protocols, Layer-3 redundancy schemes, acceleration, AAA/Radius services (i.e., terminal registration on the network), DHCP/DNS, trivial file transfer protocol (TFTP), network time protocol (NTP), public key encryption (PKI), and the like. Such gateways are expensive to build and maintain. Furthermore, the services and functionality offered by these gateways are isolated to the customers for which the gateway specifically service. Many gateways providing the same or similar services and must be maintained in parallel in order to provide service to an entire customer base over a large geographical area.

Further, current implementations of satellite networks fail to provide the services and functionality at layer-2 (i.e., layer-2 of the ISO-model stack) communicating from one point on the network to another. Additionally, current implementations of satellite networks only provide redundancy within the gateway. For example, current satellite network implementations may provide redundant access to a points on the network (i.e., multiple fiber lines to a gateway such that if one line is compromised, service still continues over the second line); however, if, for example, the gateway itself is down (or a service of the gateway), there is currently no way for another gateway to continue to provide the service (or services) of a failed gateway.

Furthermore, current gateway implementations communicate over layer-3 or "layer-2.5" (i.e., multiprotocol label switching (MPLS)). As such, networks using only layer-3 or layer-2.5 are limited in the services and network configurations that can be offered. For example, an MPLS network may be deployed using RFC-2547 which is MPLS that redistributes routes using border gateway protocol (BGP). Accordingly, such a deployment includes a layer-3 network over an MPLS underlying network, so each core node or gateway is routed (i.e., the MAC header of packets transmitted are altered), thus limiting the capabilities of the network. Hence, for these and other reasons, improvements in the art are needed.

SUMMARY OF THE INVENTION

In various embodiments, systems and methods providing redundant core nodes in a network are provided. Satellite gateways can be in communication with subscribers. Core nodes can provide networking at layer-2 (L2) of the Open Systems Interconnect (OSI) model (L2), to the subscribers. A first core node can provide networking services to a first subset of the subscribers. In response to a failure, a second core node can provide the networking services to the first subset of the subscribers.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment, it being understood that various changes may be made in the function and arrangement of elements without departing from the spirit and scope as set forth in the appended claims. Some of the various exemplary embodiments may be summarized as follows.

Aspects of the invention include implementing nodes which provide intelligence and functionality (e.g., services, etc). Furthermore, the nodes are interconnected with gateways which provide connectivity to satellites. As such, enterprises, content distribution networks (CDNs), etc. are able to connect to any node or other point in the network (including gateways), and seems like being plugged in to any other node or point in the network.

Figure 1:
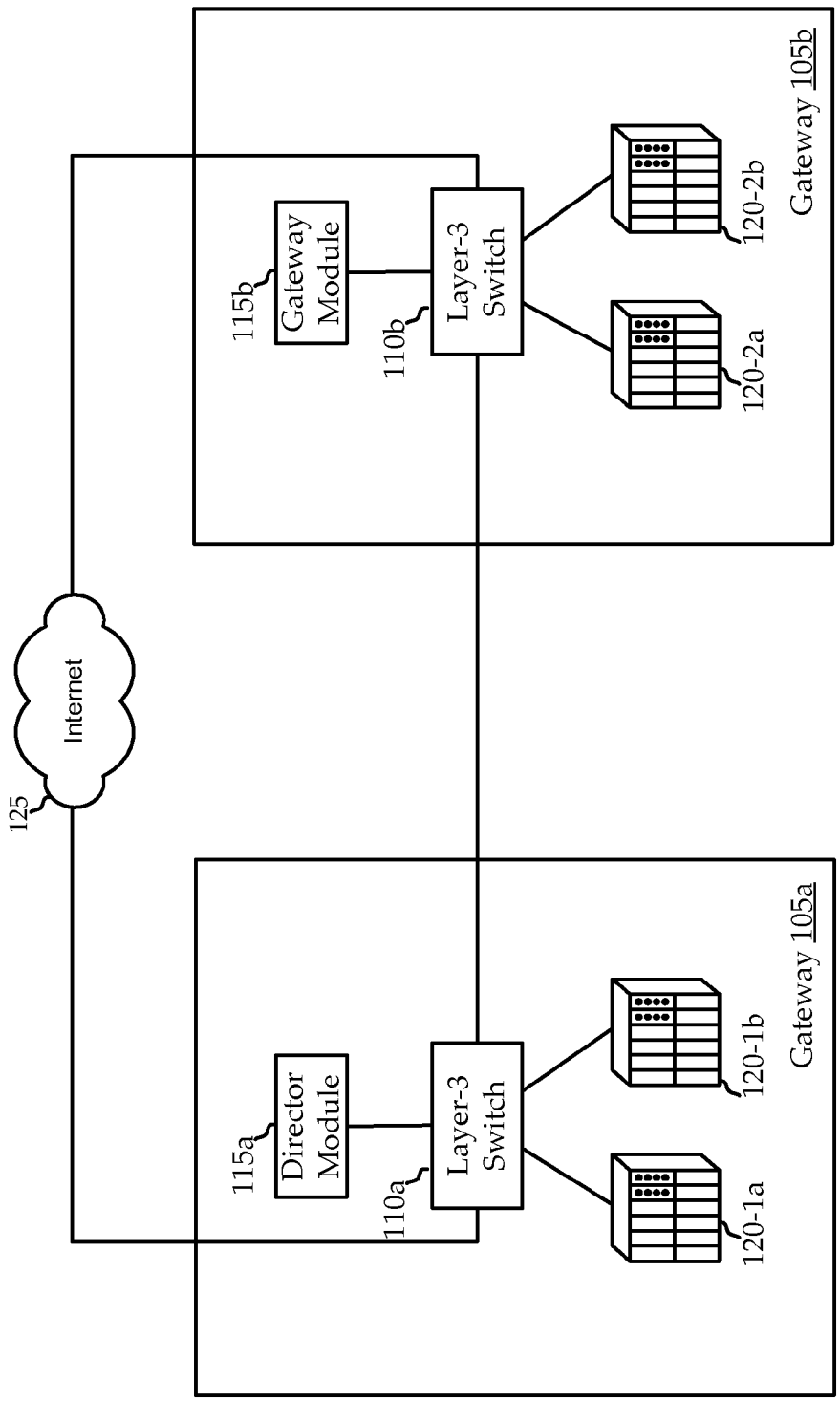
FIG. 1 shows a block diagram of one embodiment of a gateways within a satellite communications network.

FIG. 1 illustrates a gateway 105a in communication with a gateway 105b. Further, gateway 105a and 105b are in communication with the Internet 125. The gateways 105 receive a request at a satellite modem termination system (SMTS) 120. The SMTS 120 sends the request to a layer-3 switch 110, in communication with an director module 115. The director module 115 determines and generates routing data for communicating the request. Typically, the gateway module 115 may be a control plane application which sets up connectivity to a router (not shown). Even where actual routing is not done by the gateway module 115, components of the gateways 105 may implement routing functions.

As used herein, a "routed network" refers to a network having a number of routers, configured to use protocols at layer-3 and above of the OSI stack (e.g., or substantially equivalent types of protocols) to route data through the network. The layer-3 switch as used herein, is intended to broadly include any type of network device configured to route at layers 3 and above of the OSI stack (e.g., or provide substantially similar network layer functionality). Particularly, routing is intended to be distinguished from switching (e.g., at layer 2 of the OSI stack (e.g., or substantially similar functionality), as will become more clear from the description below.

While utilizing higher layers to route communications may provide certain features, such as enhanced interoperability, it may also limit certain capabilities of the network. As one exemplary limitation, at each node where a layer-3 routing decision is made, determining the appropriate routing may involve parsing packet headers, evaluating parsed header information against routing tables and port designations, etc. These steps may limit the type of traffic that can be sent over the network, as well as the protocols available for transport on the network.

In another exemplary limitation, at each router, layer-2 headers are typically stripped off and replaced with other tags to identify at least the next routing of the data through the network. As such, it is impossible to maintain a single network between routed terminals. In other words, a packet which is generated at one LAN, passes through one or more routers (i.e., at layer-3 or above) and is received at another LAN, will always be considered to be received from a different network. Accordingly, any benefit of a single network configuration is unattainable in a layer-3 routed network. For example, tags for supporting proprietary service provider networks, Multiprotocol Label Switching (MPLS), and/or other types of networks are impossible to maintain across large geographic regions (e.g., multiple LANs, WANs, subnets, etc.).

For example, CPEs (not shown) and other client devices connected to gateway 105a could not be located on the same network (e.g., same LAN, subnet, etc.) as CPEs connected to gateway 105b. In other words, once a packets from layer-3 switch 110a were sent to layer-3 switch 110b, the packets would no longer be considered to be on the same network (e.g., LAN, subnet, etc.) as gateway 105a's network. Accordingly, virtual networking protocols such as, VPN, MPLS, etc. must be used for sending traffic between gateway 105a and 105b. Furthermore, if a service or services fail on gateway 105a, then gateway 105b is unable to provide the failed service or services to CPEs connected to gateway 105a (the two gateways are, from a networking prospective, isolated). However, if the traffic between gateway 105a and 105b was switched at layer-2, then gateway 105b would be able to provide the failed service or services to the CPEs connected to gateway 105a.

Figure 2:
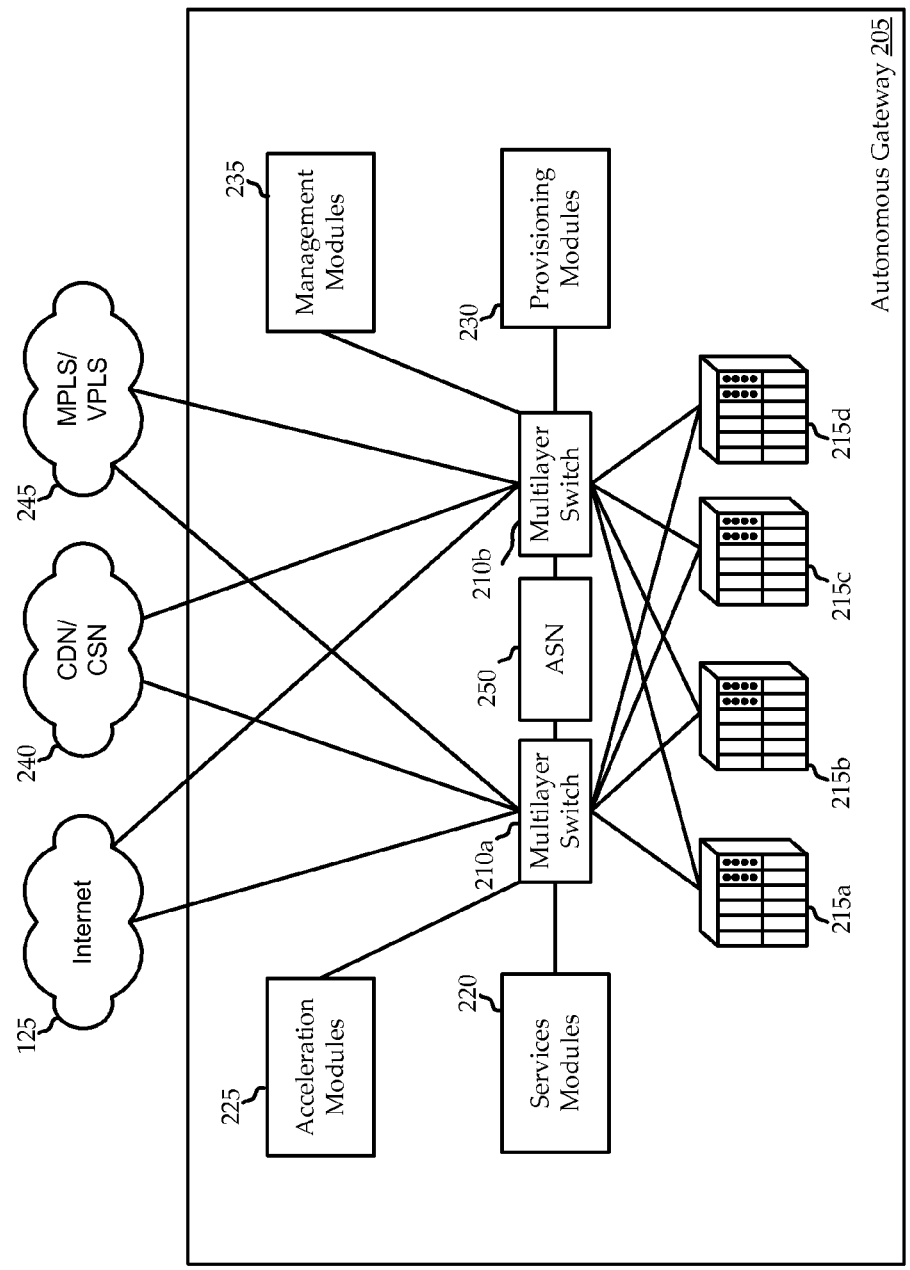
FIG. 2 shows a block diagram of an embodiment of an autonomous gateway, according to various embodiments of the invention.

FIG. 2 shows an embodiment of an autonomous gateway 205, according to various embodiments of the present invention. In some embodiments, the autonomous gateway 205 includes one or more SMTSs 215 (a-d), which implements substantially as the SMTSs 215 of the non-autonomous gateway 305 of FIG. 3. The SMTSs 215 may be in communication with one or more multilayer switches 210a and 210b. The multilayer switches 210a and 210b may be in communication with an ASN module 250, and may also be in communication with the Internet 125, CDN/CSN networks 240, or MPLS/VPLS 245. The multilayer switches 210a and 210b may be configured to process data to and from one or more modules. For example, the multilayer switches 210a and 210b may be in communication with services module 220, acceleration modules 225, provisioning modules 230, and/or management modules 235. It will be appreciated that, unlike the gateway 105 of FIG. 1, in accordance with aspects of the present invention, embodiments of the autonomous gateway 205 are able to implement some of the enhanced functionality of the non-autonomous gateways 305 and core node 405.

In one embodiment, autonomous gateway 205 is configured to operate autonomously or separately from other gateways and/or core nodes. For example, using services module 220, acceleration modules 225, provisioning modules 230, and management modules 235, autonomous gateway 205 is able to completely manage requests received through SMTSs 215 and multilayer switches 210a and 210b. Furthermore, since multilayer switches 210a and 210b are equipped to handle requests at both layer-2 and layer-3, autonomous gateway 205 is not limited in the same ways as gateway 105.

In one embodiment, services module 220 may include services, such as, AAA, RADIUS, DHCP, DNS, TFTP, NTP, PKI, etc. Furthermore, management modules 235 may include billing, terminal, shell, IP flow information export (IPFIX), traffic and/or flow accounting and analysis, SNMP, syslog, etc. Accordingly, autonomous gateway 205 is equipped to function as a "stand-alone" entity, locally (or pseudo-locally) providing services and management to CPEs.

Figure 3:
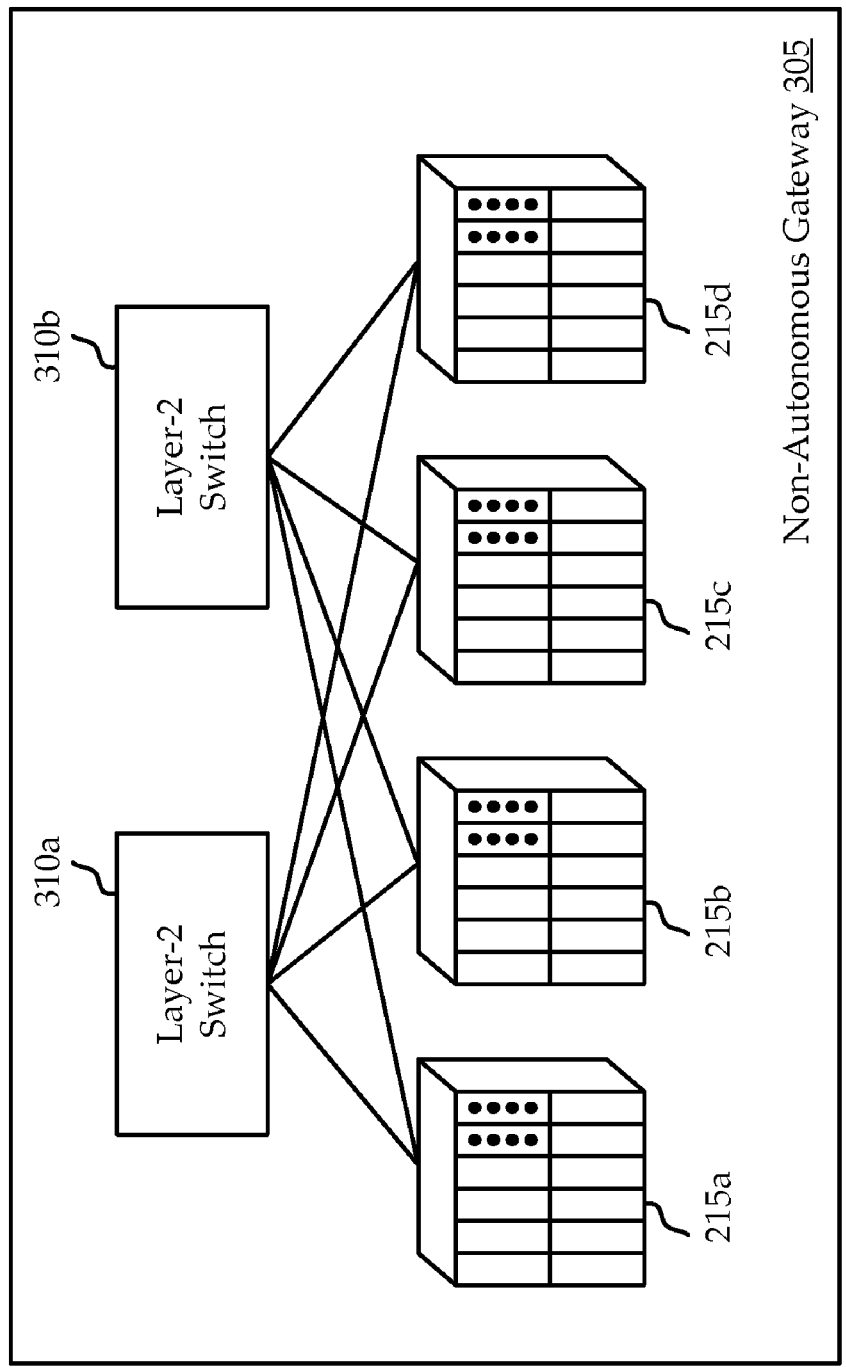
FIG. 3 shows a block diagram of an embodiment of a non-autonomous gateway, according to various embodiments of the invention.

Turning now to FIG. 3, illustrating an embodiment of a non-autonomous gateway 305, in accordance with embodiments of the present invention. The non-autonomous gateway 305 may include a number of SMTSs 215 (a-d). Embodiments of each SMTS 215 include multiple base stations (not shown). For example, each base station may be implemented on a circuit card or other type of component integrates into the SMTS 215. The illustrated non-autonomous gateway 305 includes four SMTSs 215, each in communication with two layer-2 switches 310a and 310b. For example, each SMTS 215 is coupled with both layer-2 switches 310a and 310b to provide redundancy and/or other functionality. Each layer-2 switch 310 may then be in communication with a core node 405.

Embodiments of the non-autonomous gateway 305 are configured to support minimal functionality and provide minimal services. Unlike the autonomous gateway 205, non-autonomous gateway 305 does not include services module 220, acceleration modules 225, provisioning modules 230, and management modules 235. Hence, non-autonomous gateway 305 simple design requires minimal management and maintenance, as well as a significantly lower cost than the autonomous gateway 205. Non-autonomous gateway 305 is configured to send and receive communications through SMTSs 215a-d (e.g., to and from a satellite) and similarly send and receive communications through layer-2 switches 310a and 310b (e.g., to and from core node 405).

Figure 4:
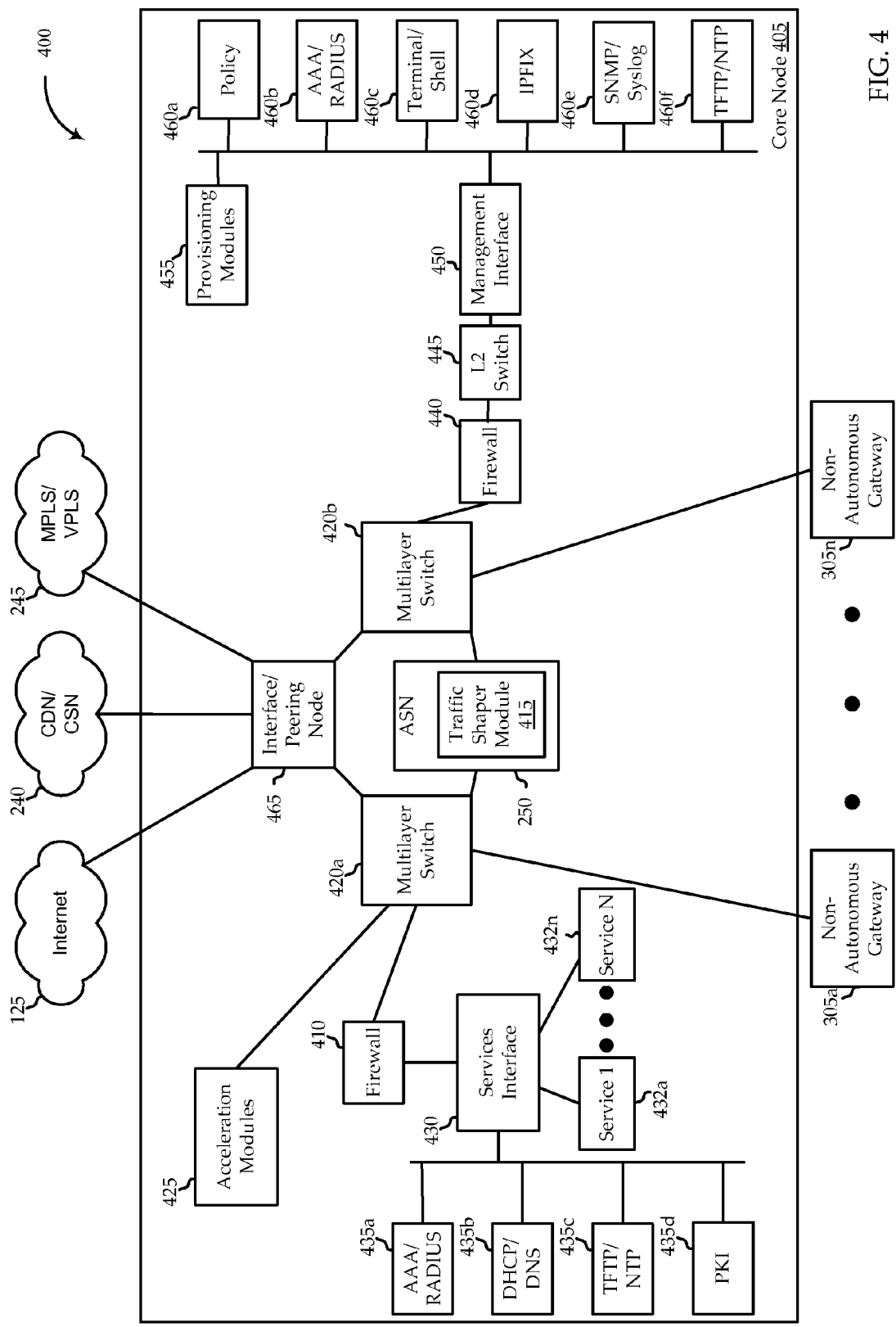
FIG. 4 shows a block diagram of one embodiment of a core node within a satellite communications network, according to various embodiments of the invention.

FIG. 4 illustrates a core node 405, in accordance with one embodiment of the present invention. Core node 405 may be in communication with 1 to N non-autonomous gateways 305. As discussed above, the non-autonomous gateways 305 communicate with the core node 405 using layer-2 connectivity between one or more layer-2 switches 310 in the non-autonomous gateways 305 and one or more multilayer switches 420a and 420b in the core node 405. The illustrative core node 405 is in communication with multiple non-autonomous gateways 305a-305n via multilayer switches 420a and 420b. In various embodiments, the multilayer switches 420a and 420b are in communication with each other either directly or indirectly (e.g., via an ASN module 250).

In some embodiments, the ASN module 250 includes one or more processing components for processing traffic received at the multilayer switches 420a and 420b. In one embodiment, the ASN module 250 includes a traffic shaper module 415. The traffic shaper module 415 is a service which is configured to assist in optimizing performance of network communications (e.g., reduce latency, increase effective bandwidth, etc.), for example, by managing packets in a traffic stream to conform to one or more predetermined traffic profiles.

The multilayer switches 420a and 420b may further be in communication with one or more of the Internet 125, CDN/CSN networks 240, and MPLS/VPLS networks 245. In some embodiments, the core node 405 includes an interface/peering node 465 for interfacing with these networks. For example, an Internet service provider or CDN service provider may interface with the core node 405 via the interface/peering node 465.

Embodiments of the multilayer switches 420a and 420b process data by using one or more processing modules or interfaces in communication with the multilayer switches 420a and 420b. For example, as illustrated, the multilayer switches 420a and 420b may be in communication with AA/RADIUS 435a, DHCP/DNS 435B, TFTP/NTP 435c, or PKI 435d, through a firewall 410 and services interface 430. Furthermore, multilayer switches 420a and 420b may be in communication with a provisioning module 455 through a firewall 440, a layer-2 switch 445, and a management interface 450. In addition to being in communication with provisioning module 455, multilayer switches 420a and 420b may also be in communication with policy module 460a, AAA/RADIUS 460b, terminal/shell 460c, IP flow information export (IPFIX), traffic and/or flow accounting and analysis 460d, SNMP/syslog 460e, and TFTP/NTP 460f. Communication with these modules may be restricted, for example, certain modules may have access to (and may use) private customer data, proprietary algorithms, etc., and it may be desirable to insulate that data from unauthorized external access. In fact, it will be appreciated that many types of physical and/or logical security may be used to protect operations and data of the core node 405. For example, each core node 405 may be located within a physically secured facility, like a guarded military-style installation.

In a further embodiment, services interface may be communication with service 1 432a to service N 432N. Service 1 to service N may be any one of the services described above (i.e., AAA/RADIUS 345a, DHCP/DNS 435b, TFTP/NTP 460f, etc.), as well as other services provided in satellite networking environment. Furthermore, any number of services may be provided (i.e., 1–N number of services).

In one embodiment, the acceleration modules 225 include beam-specific acceleration modules and a failover module which detects a connection failure and redirects network traffic to a backup or secondary connection. Embodiments of the acceleration modules 425 provide various types of application, WAN/LAN, and/or other acceleration functionality. In one embodiment, the acceleration modules 425 implement functionality of AcceleNet applications from Intelligent Compression Technologies, Inc. ("ICT"), a division of ViaSat, Inc. This functionality may be used to exploit information from higher layers of the protocol stack (e.g., layers 4-7 of the OSI stack) through use of software or firmware operating in each beam-specific acceleration module. The acceleration modules 425 may provide high payload compression, which may allow faster transfer of the data and enhances the effective capacity of the network. In some embodiments, certain types of data (e.g., User Datagram Protocol (UDP) data traffic) bypass the acceleration modules 425, while other types of data (e.g., Transmission Control Protocol (TCP) data traffic) are routed through the accelerator module 350 for processing. For example, IP television programming may bypass the acceleration modules 425, while web video may be sent to the acceleration modules 425 from the multilayer switches 420a and 420b.

In one embodiment, the AAA/Radius module 460b may implement functionality of an Authentication Authorization Accounting (AAA) server, a Remote Authentication Dial-In User Service (RADIUS) protocol, an Extensible Authentication Protocol (EAP), a network access server (NAS), etc. Embodiments of the DHCP/DNS module 435b may implement various IP management functions, including Dynamic Host Configuration Protocol (DHCP) interpretation, Domain Name System (DNS) look-ups and translations, etc. Embodiments of the TFTP/NTP module 435c may implement various types of protocol-based functions, including file transfer protocols (e.g., File Transfer Protocol (FTP), trivial file transfer protocol (TFTP), etc.), synchronization protocols (e.g., Network Time Protocol (NTP)), etc. Embodiments of the PKI module 435d implement various types of encryption functionality, including management of Public Key Infrastructures (PKIs), etc.

In a further embodiment, policy module 460a may control certain billing functions, handle fair access policies (FAPs), etc. Embodiments of the terminal/shell module 640c may implement various types of connectivity with individual devices. Embodiments of the SNMP/Syslog module 460e may implement various network protocol management and logging functions. For example, the SNMP/Syslog module 460e may use the Simple Network Management Protocol (SNMP) to expose network management information and the Syslog standard to log network messages.

Figure 5A:
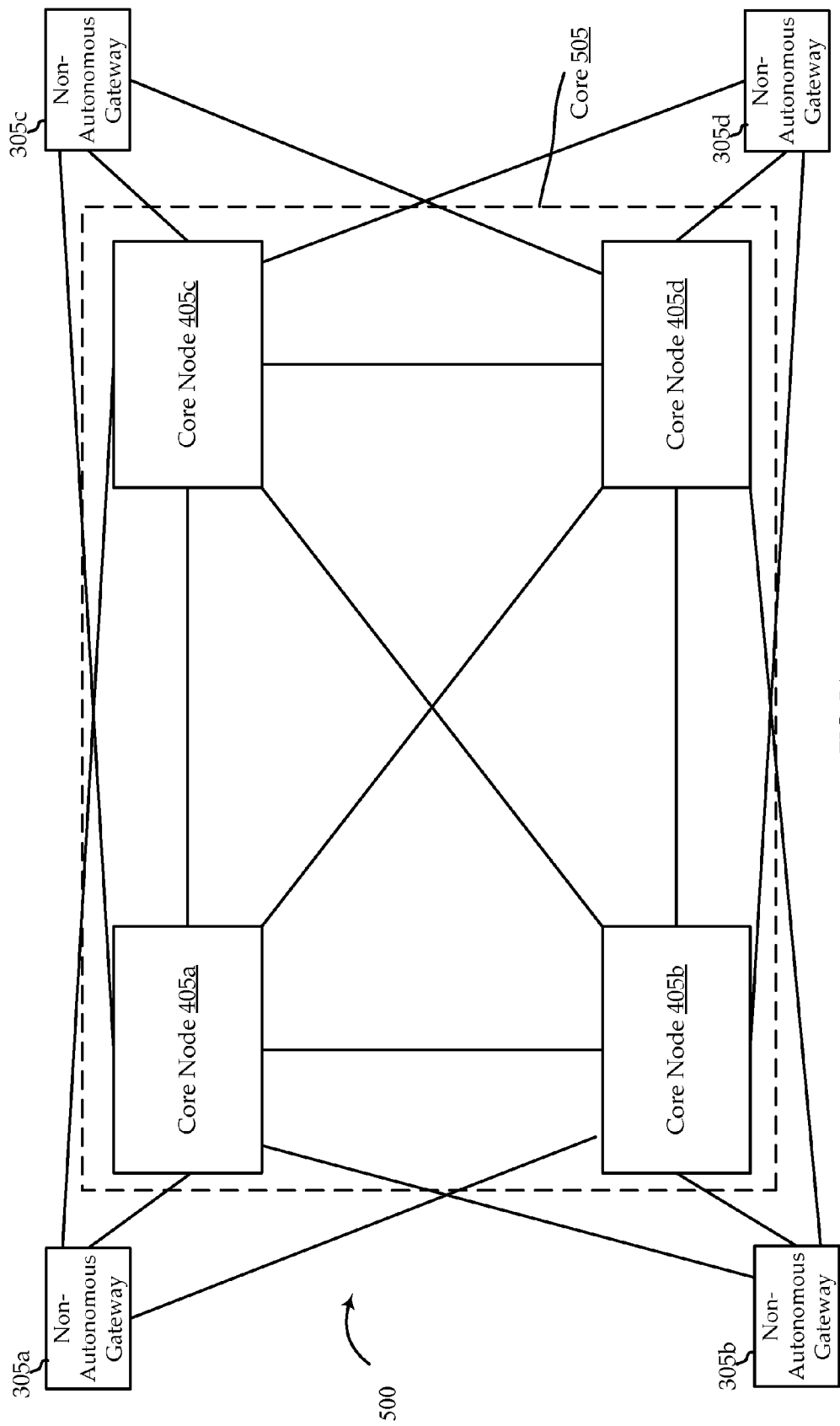
FIG. 5A a block diagram of one embodiment of a core node architecture for a satellite communications network, according to various embodiments of the invention.

Accordingly, core node 405 is configured to internally handle various services and functionality. Turning now to FIG. 5A, which illustrates one embodiment of a core-based network architecture 500, implementing a core 505 which includes core nodes 405. In one embodiment, each core node 405a-d is connected to every other core node, and each core node 405a-d is connected to a non-autonomous gateway 305a-d, respectively. This configuration is merely for the purposes of explanation, and it should be noted that any number of core nodes or non-autonomous gateways may be used. Also, core nodes may be indirectly connected to other core nodes, core nodes may be connected to other core nodes through one or more non-autonomous gateway, etc.

Such a network configuration provides significant benefits. For example, service and/or resource specific failure at a core node, or complete failure of a core node is able to be redundantly managed by one or more of the other core nodes. Assuming, for the purpose of explanation, that core node 405a services non-autonomous gateway 305a, core node 405b services non-autonomous gateway 305b, and so forth. If, for example, DHCP service at core node 405b fails, then DHCP service requests from the customers connected with non-autonomous gateway 305b would be serviced through core node 405d, without the customers noticing any change. For example, their IP address, their session, etc. would remain the same. Furthermore, the other services provided by core node 405b (e.g., DNS, acceleration, PKI, etc.) would still be handled by core node 405b, and only the failed service would be diverted to core node 405d.

Such a service specific redundancy scheme is possible by this network configuration, in part, because of the end-to-end layer-2 connectivity, the placement of the core nodes, and structure and configuration of the core nodes 405. For example, if the network did not have end-to-end layer-2 connectivity, then such redundancy would not be possible. If the packets were routed (i.e., layer-3 or above), or virtually switched (i.e., MPLS), then once a packet went from core node 405b to core node 405d, the MAC header of the packet would be altered, and as such the network (i.e., the LAN, subnet, etc.) of the packet would change. Accordingly, the ability to provide service through the new core node (e.g., core node 405d) would be lost.

Similarly, if a core node completely fails or the connection (e.g., fiber cable) between a core node and a non-autonomous gateway fails, then all of the operations of the failed core node are able to be assumed by (or diverted to) one or more other core nodes. For example, if the connection between non-autonomous gateway 305a and core node 405a is cut or damaged, then core node 405c may provide the services previously provided by core node 405a to non-autonomous gateway 405a. In one embodiment, in both examples the core node assuming the failed service in response to a complete failure may be notified of the failure by, for example, time-to-live (TTL) packets, acknowledgment packets, etc. If the core node's functions fall below a threshold, another core node may be triggered to assume servicing of the failed service (or services).

Furthermore, such a network configuration is configured to allow sharing of resources among the core nodes. For example, one or more resources at one code node may be over-burdened, while other core nodes may be running under capacity. In such a situation, some or all of the services from the over-burdened core node may be diverted to one or more other core nodes. As such, the usage of all cores may be distributed in order to maximize core node resource use and avoid a core node from being over committed.

It should be noted that any available path within network 500 may be used. For example, it may be more efficient or necessary for a failed service at core node 405c to be handled by core node 504b, by passing though non-autonomous gateway 305d. As such, network 500 provides completely dynamic paths among the core nodes 405 and non-autonomous gateways 305. Furthermore, within network 500, any service can be provided to any customer by any core at any time. In one embodiment, core node connectivity may be fully meshed at layer-2 using VPLS.

In one embodiment, because core node 405 is configured to provide end-to-end layer-2 connectivity across a network, core node 405 can peer with one or more peering nodes. For example, a peering node may connect with non-autonomous gateway 305d. The customers connected to non-autonomous gateways 305a-c can receive the content from the peering node connected to non-autonomous gateway 305d, as though the peering node was connected directly to their respective non-autonomous gateways 305a-c. This is due, in part, to the end-to-end layer-2 connectivity and inter-code connectivity. As such, the content provided by the peering node to customers connected with non-autonomous gateway 305d is also provided to each of the other customers connected with non-autonomous gateways 305a-c. As such, geographically dispersed nodes (or gateways) are able to be peered together. For example, a node in Denver is able to peer with another node in Seattle, and so forth.

For example, a peering node in Dallas connected to a non-autonomous gateway 305 in Dallas can provide their content to customers in San Francisco (e.g., non-autonomous gateway 305a), Denver (e.g., non-autonomous gateway 305b), Salt Lake (e.g., non-autonomous gateway 305c), by only connecting through a single drop point (i.e., Dallas). As such, a peering node providing content significantly increases the number of customers, without adding additional drop points. This is particularly useful in a peering context because in order for a peering relationship to exist, the two networks need to be "peers" (i.e., be relatively equal in content and customer base). Network 500 significantly increases the number of customers that the entity implementing network 500 can represent to the potential peer, thus increasing the likelihood of developing a peering (or equal) relationship.

Similar to a peering node, network 500 may connect with content service network (CSN) 240 and/or a content delivery network (CDN) 240 through one or more gateways 305. Like a peering relationship, CSN/CDN 240 provides content and services to a network provider, and typically such CSN/CDNs 240 are located at high traffic areas (e.g., New York, San Francisco, Dallas, etc.). Moving these CSN/CDNs 240 to more remote of more locations is often not economical. Accordingly, network 500 allows CSN/CDN 240 to connect at any gateway 305 or core node 405, and not only provide the content and/or services to the customers at the connected core node 405 or non-autonomous gateway 305, but to customers within the entire network 500 connected to all non-autonomous gateways 305 and core nodes 405. Thus, the CSN/CDN 240 can connect at one drop point, and provide content to all customers within network 500.

This, in part, is made possible by the end-to-end layer-2 connectivity of network 500. If the network was routed, then the customers not directly connected to the gateway or core node at the drop point for the CSN/CDN 240, would not be on the same network and would not be able to receive the content and services. Furthermore, the redundancy scheme of network 500 provides a sufficient amount redundancy to accommodate for such a large number of customers. Without the redundancy scheme of network 500, CSN/CDN 240 would not be able to be sufficiently supported.

Additionally, network 500 is capable of utilizing out-of-band failover networks for additional redundancy (e.g., out of band (OOB) network). Again, the out-of-band network can only be connected to one non-autonomous gateway 305 or core node 405, but still provide the redundancy to any part of network 500. As such, network 500 need only connect to the out-of-band network at one location in order to gain the benefit of the out-of-band network throughout the entire network 500.

Figure 5B:
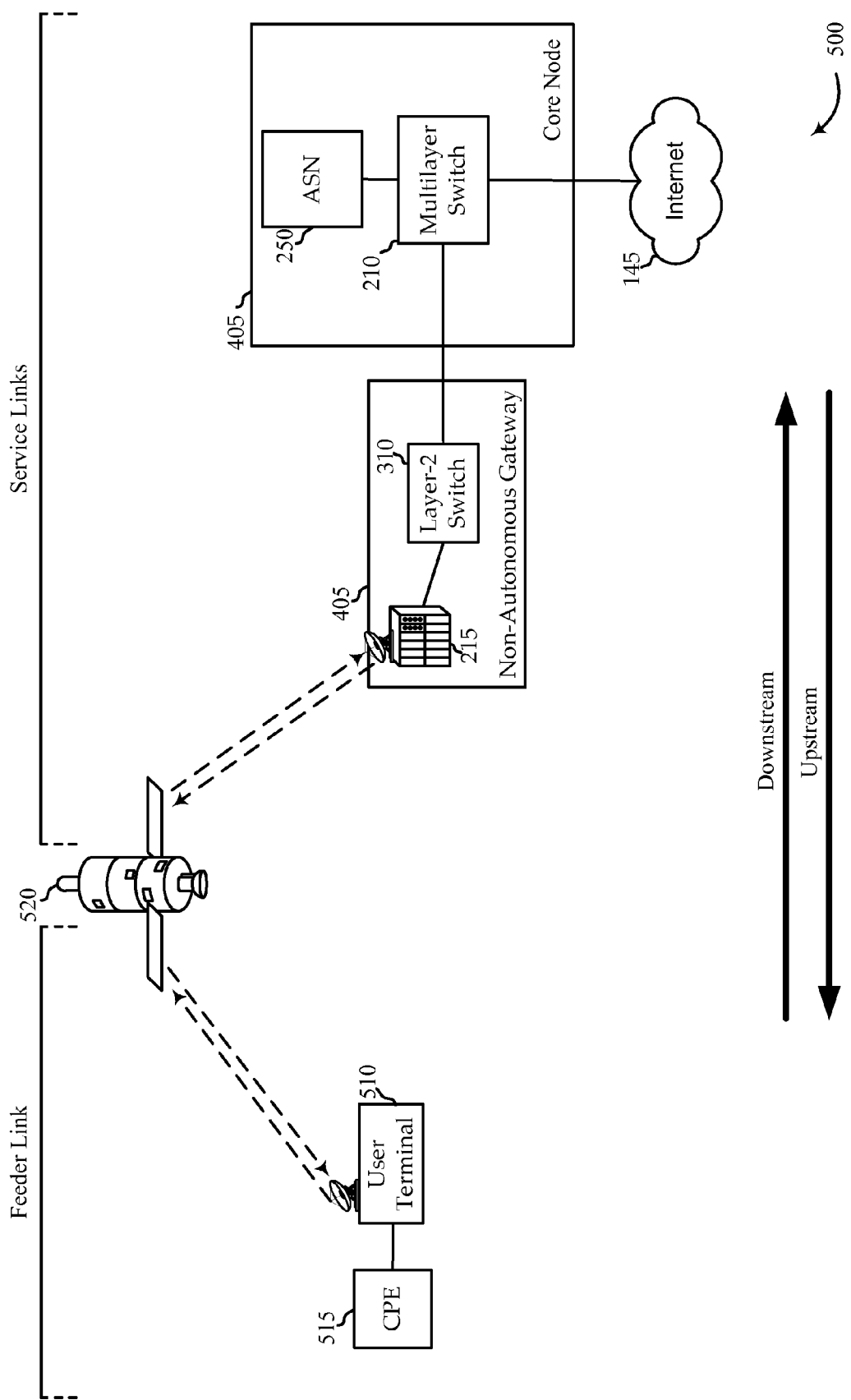
FIG. 5B a block diagram of one embodiment of flow of a core node architecture for a satellite communications network, according to various embodiments of the invention.

FIG. 5B shows an illustrative communication link between a customer premises equipment (CPE) 515 (i.e., customer, client, etc.) and Internet 145, through a core node 405. In one embodiment, a request is generated at CPE 515, which is sent to UT 510 and then transmitted over satellite 520 to a base station (not shown) in an SMTS 215 at non-autonomous gateway 305. The request is switched at layer-2 though layer-2 switch 310 and sent to a multilayer switch 210 at core node 405. Core node 405 then sends the request to Internet 145 (or any other network destination). A response back to CPE 515 then would flow back though the network, in the same or similar manner.

Figure 6:
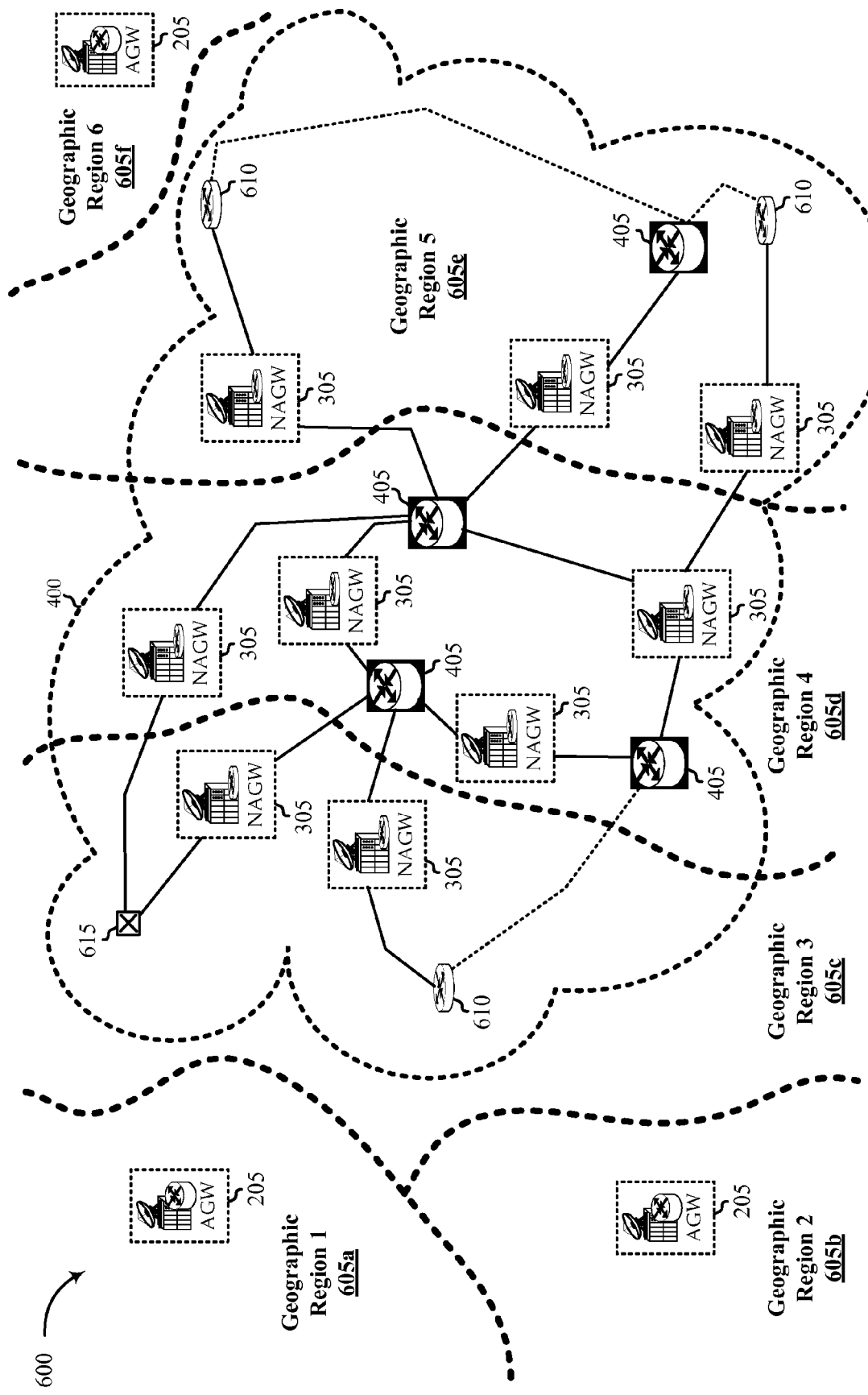
FIG. 6 a block diagram of one embodiment of a geographic topology for a core node architecture within a satellite communications network, according to various embodiments of the invention.

FIG. 6 shows an embodiment of a satellite communications network 600 that distributes autonomous gateways 205 and non-autonomous gateways 305 across a number of geographically dispersed regions 605, according to various embodiments. In one embodiment, a first geographic region 605*a*, a second geographic region 605*b* and a sixth geographic region 605*f* represent environments where it is not cost-effective to provide communications with core nodes 265. As such, these geographic regions 605 are illustrated as having autonomous gateways 205. For example, autonomous gateways 205 may be used in island regions, geographically remote regions, regions with particular types of topologies (e.g., large mountain ranges), etc.

In contrast to the above-mentioned regions (geographic regions 605*a*, 605*b*, and 605*f*), a third geographic region 605*c*, a fourth geographic region 605*d*, and a fifth geographic region 605*e* indicate regions where it is cost-effective to implement a core-based non-routed ground segment network 600. As illustrated, each non-autonomous gateway 305 is either directly or indirectly in communication with at least one core node 305 (e.g., typically two core nodes). Other components may also be included in the non-routed ground segment network 600. For example, additional switches 610, optical cross-connects 615, etc. may be used. Further, while the non-routed ground segment network 600 is configured to provide point-to-point layer-2 connectivity, other types of connectivity may also be implemented between certain nodes. For example, one or more VPLS networks may be implemented to connect certain nodes of the non-routed ground segment network 600.

In various embodiments, core nodes 405 may be located on a new or existing fiber run, for example, between metropolitan areas. In some configurations, the core nodes 405 may be located away from the majority of spot beams associated with subscribers (e.g., in the middle of the country, where much of the subscriber population lives closer to the outsides of the country). In alternative embodiments, core nodes 405 may be located near the majority of spot beams associated with subscribers. Such spatial diversity between code nodes and subscriber terminals may, for example, facilitate frequency re-use of between service beams and feeder beams. Similarly, non-autonomous gateways 305 may be located to account for these and/or other considerations.

It is worth noting that, twelve gateways (e.g., including both non-autonomous gateways 305 and autonomous gateways 205) are illustrated. If all were implemented as autonomous gateways 205, the topology may require at least twelve ASNs, routers, switches, and other hardware components. Further, various licensing and/or support services may have to be purchased for each of the autonomous gateways 205. In some cases, licensing requirements may dictate a minimum purchase of ten thousand licenses for each ASN, which may require an initial investment into 120-thousand licenses from the first day of operation.

Using aggregated functionality in one or more core nodes 405, however, minimizes some of these issues. For example, by including four core nodes 405, each having an ASN, and only three of the twelve gateways are autonomous gateways 205. As such, only seven ASNs may be operating on the non-routed ground segment network 220. As such, only seven instances of each core networking component may be needed, only seven licenses may be needed, etc. This may allow for a softer ramp-up and other features. As can be readily seen, such a consolidation of the autonomous gateway functionality into fewer more robust core nodes 405, is a significant cost savings.

Such a network as network 600 (also network 500) provides geographically expansive network capabilities. Where other nationwide or worldwide network are routed or connected at layer-2.5, layer-3, or higher (e.g., MPLS, etc.), networks 500 and 600 are end-to-end layer-2 switched networks. Such a network, in essence, removes the geographic constraints. Since, for example, if a customer was connected with one of the non-autonomous gateways 305 in geographic region 3 605*c*, and another customer was connected with one of the non-autonomous gateways 305 in geographic region 5 605*e*, the two customers would be configured as though they were connected to the same switch in the same room.

Figure 7:
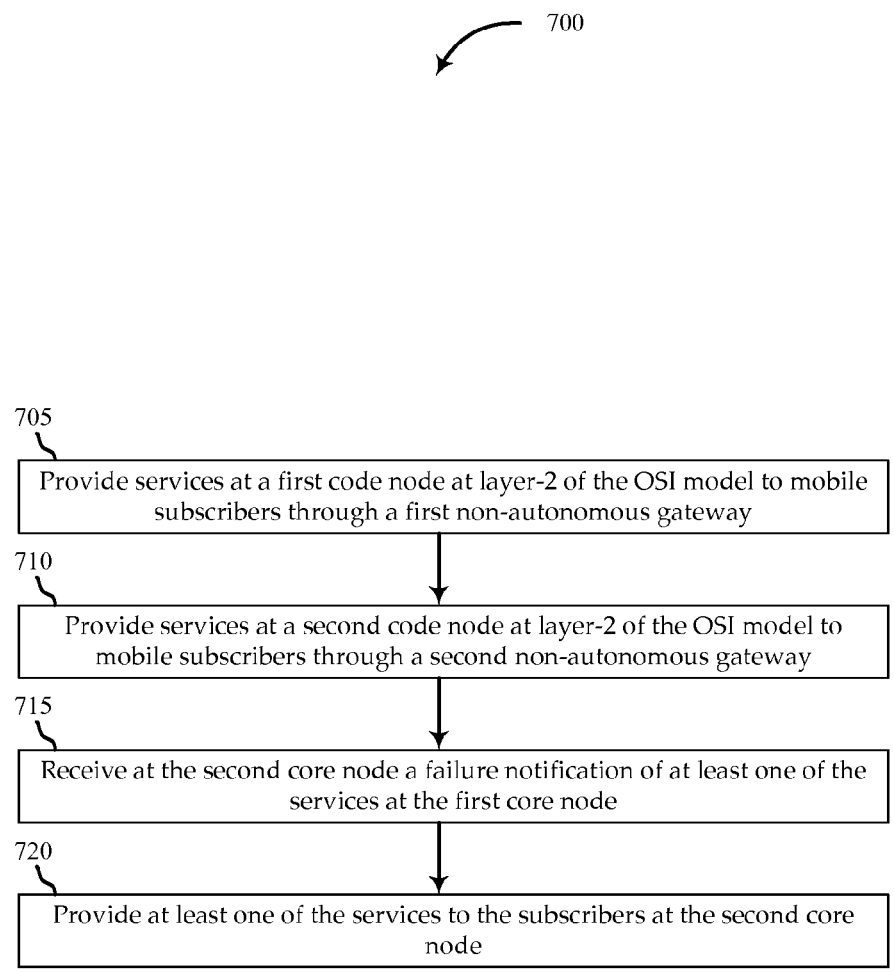
FIG. 7 shows a flow diagram of a method of implementing a core node architecture for a satellite communications network, according to various embodiments.

FIG. 7 illustrates a flow diagram describing a method 700 of implementing redundancy among core nodes, in accordance with embodiments of the present invention. At process block 705, services, at layer-2, are provided to a first set of subscribers by a first core node though a first non-autonomous gateway. At process block 710, services, at layer-2, are provided to a second set of subscribers by a second core node though a second non-autonomous gateway.

At process block 715, the second core node receives an indication that a service provided by the first core node has failed, or the core node has completely failed. At process block 720, in response to the second core node receiving the failure notification, the second core node begins to provide the failed service (or services) to the first set of subscribers. The hand-off is seamless and the first set of customers are able to maintain the same IP address, session, etc. The service (or services) is merely provided by another core node, without the first set of subscribers being aware of the change.

In a further embodiment, even without a failure by one of the core nodes, one or more services may be diverted to another core node based on load at the core node. For example, the first set of subscribers may be using a more resources than the second set of subscribers. As such, the first core node is significantly more burdened than the second core node. One or more services provided to the first set of subscribers may be diverted to the second core node in order to avoid the first core node running out of capacity, or in order to more efficiently utilize the entire capacity of the cores, collectively. The hand-off between core nodes is seamless and unnoticed by the subscribers.

Figure 8:
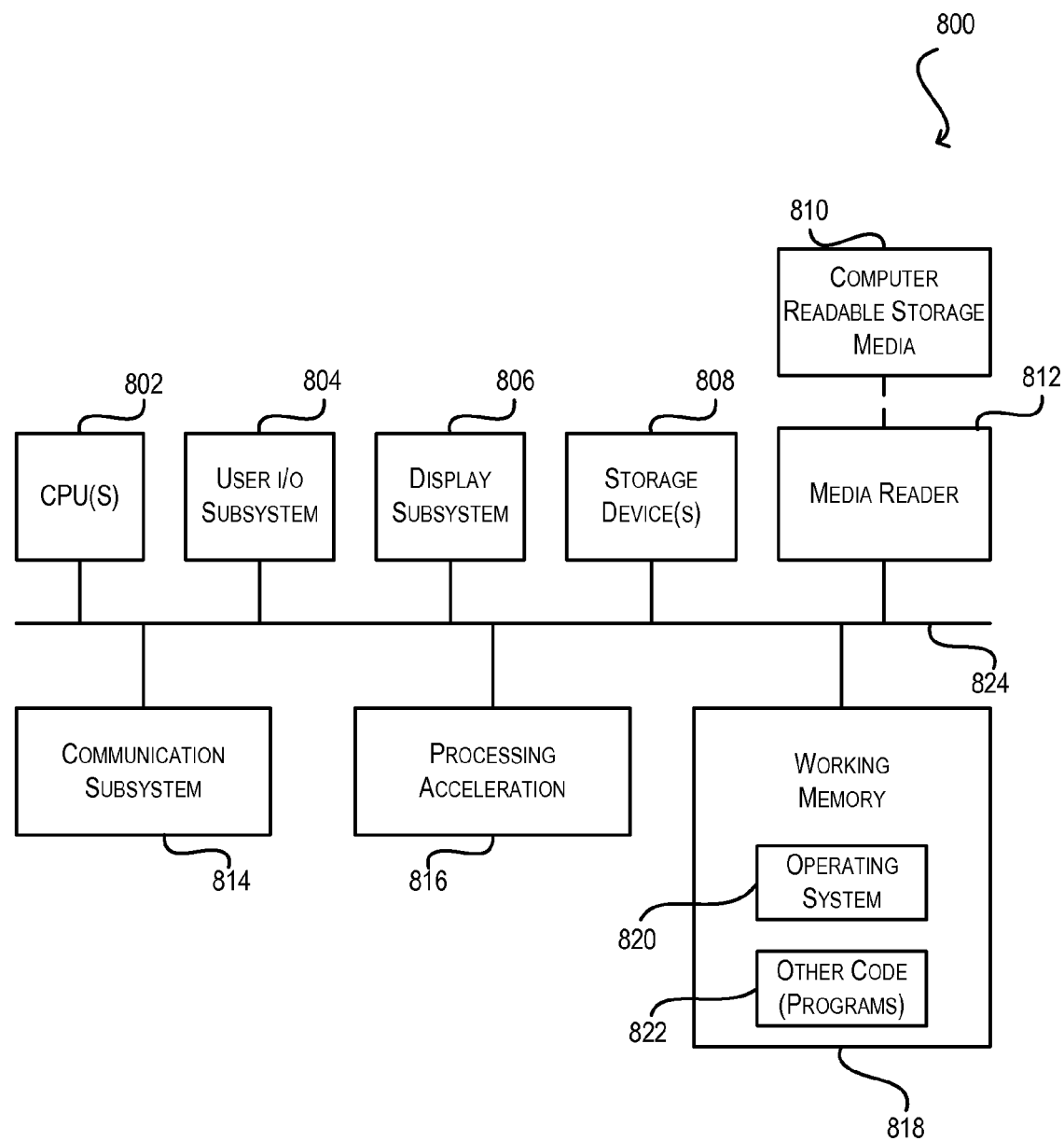
FIG. 8 is a simplified block diagram illustrating the physical components of a computer system that may be used in accordance with an embodiment of the present invention.

FIG. 8 is a simplified block diagram illustrating the physical components of a computer system 800 that may be used in accordance with an embodiment of the present invention. This diagram is merely an example, which should not unduly limit the scope of the claims. One of ordinary skill in the art would recognize many variations, alternatives, and modifications.

In various embodiments, computer system 800 may be used to implement any of the computing devices of the present invention. As shown in FIG. 8, computer system 800 comprises hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). For example, the input devices 804 are used to receive user inputs for procurement related search queries. Computer system 800 may also include one or more storage devices 808. By way of example, storage devices 808 may include devices such as disk drives, optical storage devices, and solid-state storage devices such as a random access memory (RAM) and/or a read-only memory (ROM), which can be programmable, flash-updateable and/or the like. In an embodiment, various databases are stored in the storage devices 808. For example, the central processing unit 802 is configured to retrieve data from a database and process the data for displaying on a GUI.

Computer system 800 may additionally include a computer-readable storage media reader 812, a communications subsystem 814 (e.g., a modem, a network card (wireless or wired), an infra-red communication device, etc.), and working memory 818, which may include RAM and ROM devices as described above. In some embodiments, computer system 800 may also include a processing acceleration unit 816, which can include a digital signal processor (DSP), a special-purpose processor, and/or the like.

Computer-readable storage media reader 812 can further be connected to a computer-readable storage medium 810, together (and, optionally, in combination with storage devices 808) comprehensively representing remote, local, fixed, and/or removable storage devices plus storage media for temporarily and/or more permanently containing computer-readable information. Communications system 814 may permit data to be exchanged with network and/or any other computer.

Computer system 800 may also comprise software elements, shown as being currently located within working memory 818, including an operating system 820 and/or other code 822, such as an application program (which may be a client application, Web browser, mid-tier application, RDBMS, etc.). In a particular embodiment, working memory 818 may include executable code and associated data structures for one or more of design-time or runtime components/services. It should be appreciated that alternative embodiments of computer system 800 may have numerous variations from that described above. For example, customized hardware might also be used and/or particular elements might be implemented in hardware, software (including portable software, such as applets), or both. Further, connection to other computing devices such as network input/output devices may be employed. In various embodiments, the behavior of the view functions described throughout the present application is implemented as software elements of the computer system 800.

In one set of embodiments, the techniques described herein may be implemented as program code executable by a computer system (such as a computer system 800) and may be stored on machine-readable media. Machine-readable media may include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

While the principles of the disclosure have been described above in connection with specific apparatuses and methods, it is to be clearly understood that this description is made only by way of example and not as limitation on the scope of the disclosure. Further, while the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A satellite networking system comprising:
a plurality of satellite gateways in communication with a plurality of subscribers over one or more satellite communication networks, the plurality of satellite gateways configured to send network communications to the plurality of subscribers and receive network communications from the plurality of subscribers;
a first core node in communication with at least one of the plurality of satellite gateways, the first core node configured to provide a plurality of networking services, at layer-2 (L2) of the Open Systems Interconnect (OSI) model, to a first subset of the plurality of subscribers; and a second core node in communication, at L2, with at least one of the plurality of satellite gateways and the first core node, the second core node configured to provide the plurality of networking services, at layer-2 of the OSI model, to a second subset of the plurality of subscribers, wherein in response to failure of at least one of the plurality of networking services in the first core node, the second core node providing the at least one of the plurality of networking services to the first subset of the plurality of subscribers.

2. A satellite networking system as in claim 1, wherein the first core node and the second core node are geographically located wherein:
the first core node is substantially geographically dispersed from the second core node; and
the first core node is substantially geographically removed from a coverage area provided by a set of spot beams generated by the second core node.

3. A satellite networking system as in claim 1, wherein the first core node and the second core node are geographically located substantially at opposite ends of a preexisting fiber line; and
at least one of the plurality of gateways is geographically located on the preexisting fiber line.

4. The satellite networking system as in claim 3, wherein the first core node and the second core node are geographically located wherein:
the first core node is substantially geographically dispersed from the second core node; and
the first and second core nodes are substantially geographically removed from a coverage area provided by a set of spot beams associated with subscribers.

5. The satellite networking system as in claim 3, wherein the first core node and the second core node are geographically located substantially at opposite ends of a preexisting fiber line.

6. The satellite networking system as in claim 1, wherein each of the first core node and the second core node comprise at least one multilayer switch in communication with a corresponding one of the plurality of satellite gateways.

7. The satellite networking system as in claim 6, wherein at least one of the plurality of satellite gateways comprises at least one layer-2 switch in communication with a corresponding core node and at least one satellite mode termination system in communication with the layer-2 switch.

8. The satellite networking system as in claim 1, wherein the plurality of networking services comprise one or more of the following: acceleration, compression, traffic shaping, Dynamic Host Configuration Protocol (DHCP), Domain Name Service (DNS), Public Key Infrastructures (PKI), terminal services, trivial file transfer protocol (TFTP), Network Time Protocol (NTP), accounting, and provisioning.

9. A satellite networking system comprising:
a first core node in communication, at layer-2 (L2) of the Open Systems Interconnect (OSI) model, with a first satellite gateway;
a second core node in communication, at L2, with a second satellite gateway and the first core node; and
a peering node in communication, at L2, with the first satellite gateway, wherein the peering node is configured to provide content or services at the first satellite gateway, and wherein the peering node is further configured to provide content or services at any one of the first core node, the second core node, and the second satellite gateway.

10. A satellite networking system as in claim 9, wherein each of the first satellite gateway and the second satellite gateway is a non-autonomous satellite gateway.

11. A satellite networking system as in claim 9, wherein the peering node is in communication with a content service provider network configured to provide one or more services.

12. A satellite networking system as in claim 11, further comprising a plurality of client devices in communication with the first core node.

13. A satellite networking system as in claim 12, wherein the plurality of client devices are configured to receive the one or more services through the peering node and the first core node.

14. A method of implementing a redundant core node architecture in a satellite communication network, the method comprising:
providing, at a first core node, a plurality of services, at layer-2 (L2) of the Open Systems Interconnect (OSI) model, to a first plurality of subscribers through a first satellite gateway;
providing, at a second core node, the services, at L2, to a second plurality of subscribers through a second satellite gateway and the first core node;
receiving, at the second core node, a failure notification of at least one of the plurality of services provided by the first core node;
in response to the failure notification, providing, by the second core node, the at least one of the plurality of services to the first plurality of subscribers.

15. A method of implementing a redundant core node architecture in a satellite communication network as in claim 14, wherein the plurality of services comprise one or more of the following: acceleration, compression, traffic shaping, Dynamic Host Control Protocol (DHCP), Domain Name Service (DNS), Public Key Infrastructures (PKI), terminal services, trivial file transfer protocol (TFTP), Network Time Protocol (NTP), accounting, and provisioning.

16. A method of implementing a redundant core node architecture in a satellite communication network as in claim 14, wherein the failure notification comprises one or more messages sent to the second core node to redirect at least one of the services of the first core node.

17. A method of implementing a redundant core node architecture in a satellite communication network as in claim 14, wherein each of the plurality of first subscribers is in communication with the first gateway through a corresponding user terminal (UT) and each of the second subscribers is in communication with the second gateway through a corresponding UT.

18. A method of implementing a redundant core node architecture in a satellite communication network as in claim 14, wherein each of the first core node and the second core node comprise at least one multilayer switch in communication with a corresponding one of the plurality of satellite gateways.

19. A non-transitory computer-readable medium having sets of instructions stored thereon which, when executed by one or more computers, cause the one or more computers to:
provide, at a first core node, a plurality of services, at layer-2 (L2) of the Open Systems Interconnect (OSI) model, to a first plurality of subscribers through a first satellite gateway;

provide, at a second core node, the services, at L2, to a second plurality of subscribers through a second satellite gateway and the first core node;
receive, at the second core node, a failure notification of at least one of the plurality of services provided by the first core node;

in response to the failure notification, provide, by the second core node, the at least one of the plurality of services to the first plurality of subscribers.

* * * * *